United States Patent [19]

Kordesch et al.

[11] Patent Number: 4,925,747
[45] Date of Patent: May 15, 1990

[54] CATALYTIC RECOMBINATION OF CORROSION EVOLVED HYDROGEN IN ALKALINE CELLS

[75] Inventors: Karl Kordesch, Graz, Austria; Klaus Tomantschger, Mississauga, Canada

[73] Assignee: Battery Technologies Inc., Mississauga, Canada

[21] Appl. No.: 375,888

[22] Filed: Jul. 6, 1989

Related U.S. Application Data

[63] Continuation of Ser. No. 234,749, Aug. 22, 1988, abandoned.

[30] Foreign Application Priority Data

Oct. 27, 1987 [CA] Canada .................................. 550336

[51] Int. Cl.⁵ ............................................. H07M 10/34
[52] U.S. Cl. ........................................ 429/59; 429/206
[58] Field of Search ......................... 429/57, 59, 206

[56] References Cited

U.S. PATENT DOCUMENTS 3,108,908 10/1963 Krobs ................................. 424/59
3,893,870 7/1975 Kozawa ............................. 429/57

FOREIGN PATENT DOCUMENTS 53-24539 3/1978 Japan ................................. 429/59

Primary Examiner—Stephen J. Kalafut
Attorney, Agent, or Firm—Donald E. Hewson

[57] ABSTRACT

In rechargeable or primary, electrochemical cells, hydrogen may evolve. The invention concerns the use of an auxiliary electrode material to catalyse the recombination of pressurized hydrogen, for example, the hydrogen being at pressures ranging from 5 to 15 psig up to pressure relief of the cell. The cell is a sealed cell having a metal oxide cathode, a zinc anode and aqueous, alkaline electrolyte contacting both anode and cathode. The auxiliary electrode material, which may be mixed with the cathode material or be formed into a discrete auxiliary electrode, comprises a porous substrate and a catalyst for the absorbtion of pressurized hydrogen by the electrolyte. The substrate may be carbon, graphite or metal. The catalyst may be carbon, catalytically active noble metals, salts and oxides of lead, nickel, titanium, lanthanum, chromium, tantalum and alloys thereof, and the metals or mixtures of carbon with the salts or oxides.

13 Claims, 2 Drawing Sheets

CATALYTIC RECOMBINATION OF CORROSION EVOLVED HYDROGEN IN ALKALINE CELLS

This is a continuation application of Ser. No. 234,749 filed Aug. 22, 1988, now abandoned.

FIELD OF THE INVENTION

This invention relates to primary or rechargeable, alkaline, sealed cells such as alkaline zinc/manganese dioxide cells. In particular, the invention relates to porous electrodes which may be used as cell cathodes, wherein a catalyst for the reabsorbtion of hydrogen is used with a porous conductive substrate. The invention aims to provide means of recombining hydrogen, which may be evolved during storage, recharging or even in use, with the active mass of electrolyte. Thus loss of water may be avoided and the risk of pressure build up within the cell may be reduced.

BACKGROUND OF THE INVENTION

The prior art has concerned itself, for many years, with the problem of reducing or eliminating the loss of water in galvanic cells using aqueous electrolyte and avoiding build up of excessive gas pressure in sealed cells. Hydrogen gas is evolved during charge or standby by several electrode materials as aluminum, magnesium, zinc, iron, lead, etc. The electrodes in general do not have the capability of recombining the hydrogen and the evolved gas is usually vented, causing water loss, or pressure build up in hermetically sealed cells. In sealed cells, depending on the amount of hydrogen present and the rate of generation, excessive gas pressure can build up causing rupture of the safety vent and loss of electrolyte — resulting in cell failure and electrolyte leakage. It has previously been found that cells having a porous manganese dioxide cathode have the capability of recombining the hydrogen, provided catalytically active materials are applied to the cathode electrode.

Two approaches are often used in efforts to solve the problems. These are:
1. Catalytic recombination of hydrogen and oxygen inside or outside the battery; in the latter case, provisions are made for the return of the product water to the electrolyte chamber [U.S. Pat. No. 3,630,778 (1971), U.S. Pat. No. 3,598,653 (1971), U.S. Pat. No. 3,622,398 (1971), U.S. Pat. No. 3,701,691 (1972)].
2. 2 Use of an auxiliary (third) electrode as an overcharge recombination reactor as described in "Electrochem. Technol., 4, 383" (1966) by P. Ruetschi and J. B. Ockerman.

In fact, KORDESCH et al in U.S. Pat. No. 4,224,384 report excellent hydrogen gas absorption capability of dry $MnO_2$ powder catalyzed with salts or oxides of platinum, palladium, ruthenium, rhodium, arsenic and lead. These materials, however, when employed in a wetted $MnO_2$ matrix, did not show significant hydrogen recombination rates at near atmospheric pressures. It has now surprisingly been found that these materials exhibit hydrogen recombination properties provided the gas pressure is increased, for example, in the range of 5 to 15 psig or up to the relief pressure of the cell. Catalytically active carbon bonded with PTFE is also useful.

According to the invention there is provided a rechargeable electrochemical sealed cell having a cathode, a zinc anode, and an aqueous, alkaline electrolyte contacting the anode and the cathode in which cell hydrogen may evolve. The cathode comprises a metal oxide and auxiliary cathode material comprising a porous substrate and a catalyst for the absorption of pressurized hydrogen by the electrolyte, the auxiliary cathode material being located to be at least partially wetted by the electrolyte.

The substrate may be carbon, graphite or metal, and the catalyst may be carbon, catalytically active noble metals, salts and oxides of lead, nickel titanium lanthanum, chromium, tantalum and alloys thereof, and the noble metals or mixtures of carbon with the noble metals salts or oxides. The noble metals may be, for example, platinum, palladium, ruthenium, rhodium or silver.

The auxiliary cathode material may be provided either in admixture with the metal oxide cathode, suitably in a ratio of 30:70 respectively, or as a discrete auxiliary electrode in electronic contact with the metal oxide cathode.

When the auxiliary cathode material is provided as an auxiliary disorete electrode and the metal oxide cathode is cylindrically located about an anode core, then the auxiliary electrode is suitably an annulus or disk of similar diameter to the metal oxide electrode and located in electronic contact with it at one end of the anode.

The present invention may rovide economic and effective means of removing hydrogen oxygen gas in galvanic cells. Noble metals such as platinum, palladium, :rhodium, iridium, ruthenium, and osmium show high catalytic activity for hydrogen oxidation. in alkaline electrolytes, nickel and alloys of nickel with other metals e titanium and lanthanum) were found to be active catalysts. Gas diffusion electrodes applicable to the present invention are described in the co-pending United States Patent Disclosure "Metal and Metal Oxide Catalyzed Electrodes for Electrochemical Cells and Method of Making Same" by K. Tomancsohger and K. Kordesoh, Ser. No. 234,933, filed Aug. 22, 1988, and can be employed if higher recombination current densities are desired.

Embodiments of the invention will now be described by way of illustration with reference to the drawings in conjunction with the Examples, describing various electrodes of the invention and their operating characteristics.

DESCRIPTION OF PREFERRED EMBODIMENTS

Figure 1:
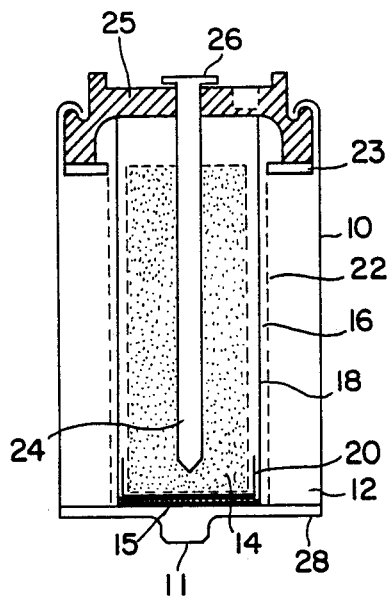
FIG. 1 is a vertical cross section of one embodiment of the invention.
Figure 2:
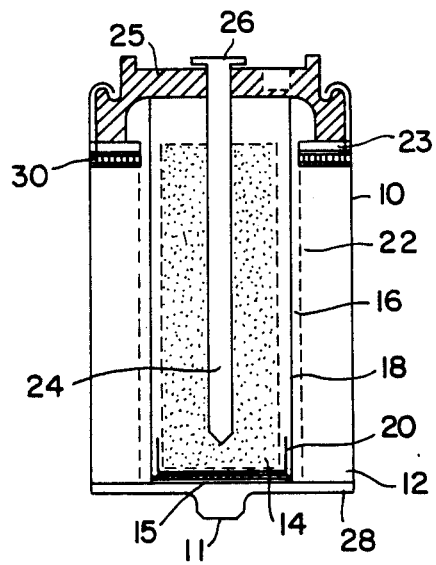
FIG. 2 is a vertical cross section of another embodiment of the invention.

FIGS. 1 and 2 of the drawings show two different embodiments of cells according to the invention. In both cases the cell comprises a steel can 10 housing a conventional metal oxide cathode 12. The base of can 10 has boss 11 forming the cathode contact formed cylindrically around anode 14. The cathode 12 may comprise finely divided manganese dioxide and graphite, and is separated from anode 14 which may comprise zinc powder, by an electrolyte premeable separator 16. The electrolyte, which may be aqueous potassium hydroxide, permeates the zinc powder of anode 14 and cathode 12 through separator 16.

As shown, the anode is confined by a basket 18, made for example, of Chicopee ™ Rayon/polyvinyl acetate. The basket 18 may be used to also carry an oxygen re-absorbtion catalyst if used. The oxygen re-absorbtion catalyst may be, for example, as described in copending United States application 234,922, filed of even date herewith in the names of TOMANTSCHGER and KORDESCH. The basket 18 is provided with an end cap 20, for example of brass insulated from the base of can 10 by insulating disk 15. The cathode 12 is confined into cylindrical shape by screen 22 and annular plastic cap 23.

A current collector nail 24 projects into the anode 14 through a casing cover 25, with its head 26 being outside of the cover 25 to form the anode contact. The cover 25 seals the can 12 by crimping formed around its edge.

FIG. 1 shows an auxiliary discrete cathode disk 28 formed of catalytically active carbon and located on the bottom of can 10 below insulating disk 15.

The auxiliary cathode disk 28 is in physical and electronic contact with cathode 12, and is wetted by electrolyte dispersed in the can 10.

The embodiment of FIG. 2 differs from that of FIG. 1 in that, in place of auxiliary cathode disk 28, an auxiliary cathode annulus 30 is placed beneath annular Plastic cap 23. The auxiliary cathode annulus may, for example, comprise silver oxide and is in physical and electronic contact with cathode 12. It, too, is wetted by electrolyte dispersed in the can 10.

FIGS. 1 and 2 both show embodiments in which discrete auxiliary cathodes are used. When the auxiliary cathode material is mixed with the metal oxide cathode, then the inventive cell may be as described with reference to either FIGS. 1 or 2, but neither disk 28 nor annulus 30 would be present, and the cathode 12 incorporates the auxiliary material.

EXAMPLE I

A conventional rechargeable $MnO_2$—Zn cell as disclosed in U.S. Pat. No. 4,384,029 was prepared using a metal cage to confine the cathode active mass. The cathode mix was formed, pressed in rings, and thereafter three rings were placed in D-cell cans containing a metal case, and separator baskets (Chicopee ™ Rayon PVA) were inserted in the center.

| CATHODE COMPOSITION | | |
|---|---|---|
| 90.0 parts | 84.1% | EMD TRONA"D" |
| 9.5 pts | 8.9% | Lonza KS-44 Graphite |
| 7.0 pts | 6.5% | 9 N KOH |
| 0.5 pts | 0.5% | Acetylene Black |
| | Total weight: 87.5 g | |

Catalytically active cathode blends were prepared substituting 3, 12, 20 and 30% of the EMD weight by $Ag_2O$ and D-size test cells were fabricated incorporating a 4 g $Ag_2O$ rich cathode material in the pip area of the cell.

A gelled zinc anode was extruded into the center, thereafter the cell was sealed using a polyethylene disk with a brass nail current collector incorporated therein and cell closure was achieved by crimping.

| ANODE COMPOSITION | |
|---|---|
| 61.4% | 3% Hg New Jersey 1205 Zn |
| 2.0% | ZnO |
| 1.0% | MgO |
| 0.8% | 70/30 CMC/940 |
| 34.8% | 9 N KOH 8% ZnO |
| | Total Weight: 21 g |

To demonstrate the capability of the present invention in terms of hydrogen recombination, two half cells of the C-cell size were fabricated, one with and one without the catalytically active cathode ring. Both open cells were placed vertically in a tube, the negative electrode void was filled with 9 N KOH to the height of the polyethylene spacer, a spirally wound Ni wire was submersed into the electrolyte, and the cells were galvanostatically discharged at 50 mA for 20 hours removing 1 Ah stored energy from the positive electrodes (total capacity appr. 8 Ah). Cell tops were used to close the elements, and contained tube fittings attached to U tubes filled with water by means of flexible tubing. After crimping the cells were gas tight, and any pressure change was indicated by the manometers.

Both cells were galvanostatically charged with 10 and 25 mA to a pressure of 300 mm water. Neither cell showed significant hydrogen recombination at atmospheric pressure.

Thereafter, the U tube was replaced by precision manometers (total gas space 2.0 ml NTP), and both cells were galvanostatically charged with 50 mA at room temperature until the pressure inside the cell reached 30 psig. The positive electrode reaction involves conversion of $MnO(OH)_2$ to $MnO_2$, and the counter reaction involves hydrogen generation on the surface of the Ni spiral wire inserted into the negative electrode cavity. Hydrogen gas was evolved at a rate of 20 ml per hour (at 50 mA). The results are summarized in FIG. 3.

Figure 3:
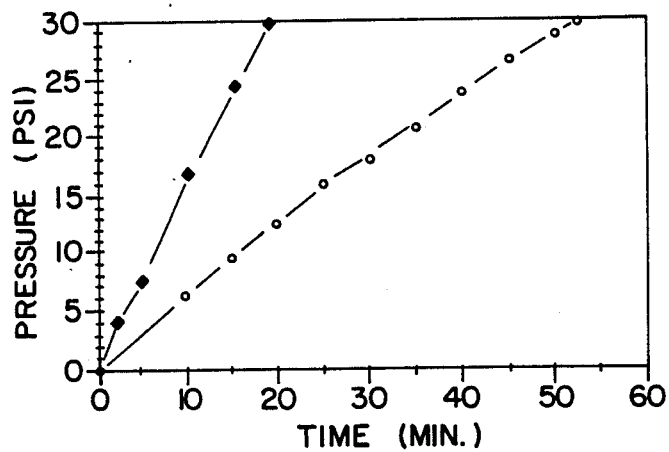
FIG. 3 is a graph comparing the operating characteristics of prior art and inventive cells as described in Example 2.

FIG. 3 shows the pressure build-up of hydrogen with time, and shows that pressure builds up faster in the conventional cell (curve A) than in the cell employing $Ag_2O$ material. Thus, it can be seen that the cell containing the To demonstrate the capability of the present invention in terms of hydrogen recombination, the series of D-cells containing the 3, 12, 20 and 30% substituted EMD was submitted to storage test at 65° C. The elevated temperature caused appreciable Zn gassing producing hydrogen overpressure in the cells. The test results are indicated in the following table:

| | 3% $Ag_2O$ | 12% $Ag_2O$ | 20% $Ag_2O$ | 30% $Ag_2O$ |
|---|---|---|---|---|
| 1 wk @ 65 C. | 6/6 OK | 6/6 OK | 6/6 OK | 6/6 OK |
| 2 wk @ 65 C. | 3/4 OK | 2/4 OK | 3/4 OK | 4/4 OK |
| 3 wk @ 65 C. | 1/1 OK | 0 | 1/1 OK | 2/2 OK |

Typical 0% $Ag_2O$ control cells exhibit a failure rate of 50% after 2 weeks at 65° C., (in this case failure means cell leakage); while all the substituted cells showed improvement and the 30% substituted cells showed no failures.

EXAMPLE II

A conventional porous $Mn_2O$ cathode as used in primary alkaline or rechargeable alkaline $Mn_2O$—Zn cells was formed, pressed in rings, and thereafter three rings were placed in C-cell cans containing a metal case to confine the cathode mass, and separator baskets (Chicopee TM Rayon/PVA placed in the center of a C-cell (FIG. 2).

| CATHODE COMPOSITION |
| --- |
| 84.1% EMD TRONA"D" |
| 8.9% Lonza KS-44 Graphite |
| 6.5% 9 N KOH |
| 0.5% Acetylene Black |
| Total Weight: 37.5 g |

Catalytically active cathode blends were prepared substituting 0 and 30% of the EMD weight by $Ag_2O$ and C-size test cells were fabricated incorporating a 4 g $Ag_2O$ rich cathode ring on the open end of the cell. catalytically active disk possessed a significant hydrogen recombination rate. Furthermore, after the power supply was disconnected, the pressure in the cell containing the active catalyst decreased significantly faster than the pressure in the control cell.

EXAMPLE III

A conventional porous $MnO_2$ cathode as used in primary alkaline or rechargeable alkaline $MnO_2$—Zn cells was formed, pressed in rings, and thereafter three rings were placed in C-cell cans containing a metal case to confine the cathode mass, and separator baskets (Chicopee Rayon/PVA) were placed in the center of a C-cell (FIG. 2).

| CATHODE COMPOSITION |
| --- |
| 84.1% EMD TRONA"D" |
| 8.9% Lonza KS-44 Graphite |
| 6.5% 9 N KOH |
| 0.5% Acetylene Black |
| Total Weight: 37.5 g |

A gas diffusion electrode, employing a mixture of Pd/Rh as hydrogen re-absorbtion catalyst, was prepared and incorporated into a 400 micron layer comprising a mixture of carbon available commercially as "Black Pearls TM 2000" and PTFE to form a foil. As additional option a separator sheet (Dexter TM C1235) can be pressed in one side and a Ni screen into the other side of the carbon/PTFE lay ⓡr comprising 70% carbon and 30% PTFE. A ring with an outer diameter of 25 mm and an inner diameter of 14 mm was punched out of the foil and the carbon ring placed on the top of the cathode with the separator side facing the cathode. After the placement of a perforated polyethylene ring, the assembly was pushed onto the cathode sleeve.

The function of the separator disk is to soak up electrolyte assisting in partial wetting of the carbon disk and providing ionic contact between hydrogen and the $MnO_2$ electrode. The carbon disk maintains electronic contact with the metal can and the metal cage, establishing a "hydrogen-$MnO_2$ short circuit element".

To demonstrate hydrogen re-absorbtion, two C-size cells were fabricated, one with and one without the catalyzed carbon ring. Both open cells cells were placed vertically in a tube, the cathode space was filled with 9 N KOH to the height of the polyethylene spacer, a spirally wound Ni wire was inserted as a counter electrode and the cells were galvanostatically discharged at 50 mA for 20 hours removing 1 Ah of the negative electrodes (total capacity appr. 8 Ah). The cell tops used to close the elements contained tube fittings attached to precision manometer (2 ml gas space).

Figure 4:
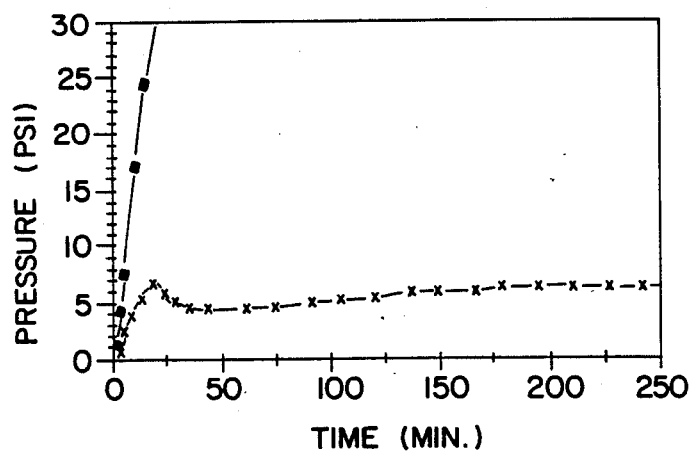
FIGS. 4 and 5 are graphs illustrating the operating characreristics of prior art and inventive cells as described in Example 3.

Both cells were galvanostatically charged with 50 mA at room temperature. The positive electrode reaction consisted of oxidation of $MnO(CH)_2$ to $MnO_2$. The counter reaction involved generation of hydrogen on the surface of the Ni wire at a rate of 20 ml hydrogen per hour (at 50 mA). FIG. 4 shows the resulting pressure curves. Curve C represents use in pressure with time for the conventional electrode without the catalysed carbon ring.

The cell containing the catalytically active ring described herein invention recombined the hydrogen generated, maintaining a cell pressure of appr. 6 psig for over four hours (curve D). During the four hours of overcharge at 50 mA, the 3.5 cm2 disk recombined over 80 ml NPT of hydrogen gas by maintaining the pressure.

Figure 5:
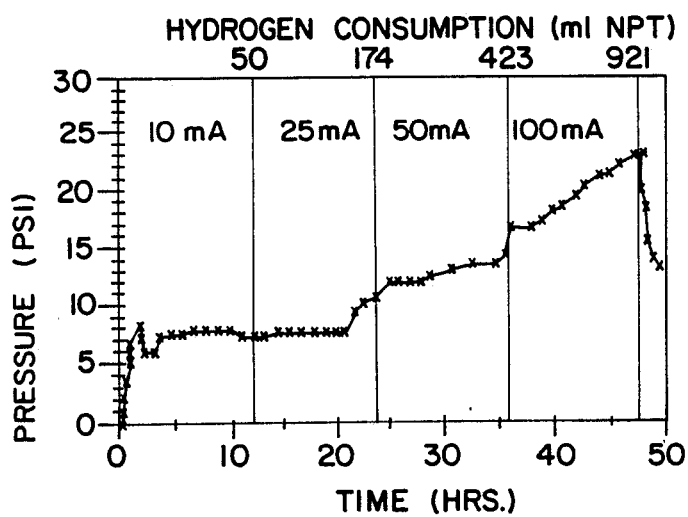

A 10 mA current was passed through the cell for 12 hours, then the current increased to 25, 50 and 100 mA in 12 hour intervals. FIG. 5 shows that over a period of time of 48 hours, over 900 ml hydrogen were generated and the recombination rate maintained the internal cell pressure below 25 psig.

The maximum hydrogen gas recombination rate was determined to be in excess of 145 ml hydrogen per hour (3.5 cm2 electrode ring area — which is equivalent to an hydrogen evolution current of 100 mA. For the C-size cell used, this is significantly more than required under "realistic user condition".

To determine the long term electrode performance, the electrode described herein was placed in a half cell and operated continuously at 50 mA/cm2 for over 1000 hours. The test was discontinued after consumption of in excess of 20 l NTP hydrogen. The following table demonstrates the Performance obtained in 6 N KOH electrolyte at room temperature for hydrogen as reaction gas.

| Time [hrs.] | Hydrogen Consumption [1] | Current [mA/cm2] | IR Free Potential [mV vs. Zn] |
| --- | --- | --- | --- |
| 0 | 0 | 50 | 22 |
| 163 | 3.4 | 50 | 10 |
| 307 | 6.4 | 50 | 25 |
| 475 | 9.9 | 50 | 30 |
| 691 | 14.3 | 50 | 46 |
| 859 | 17.8 | 50 | 47 |
| 1003 | 20.8 | 50 | 49 |

[The IR free potential is determined using laboratory procedures and standards, and is measured in millivolts as against the Reversible Hydrogen Electrode Reference].

We claim:
1. A primary or rechargable electrochemical sealed cell in which hydrogen may evolve, said cell having a manganese dioxide cathode, a zinc anode, an aqueous alkaline electrolyte contacting the anode and the cathode, and a further auxiliary cathode material comprising a porous substrate and a catalyst for the absorption of pressurized hydrogen within said cell;

wherein said pressurize hydrogen is absorbed at least by the said auxiliary cathode material in the presence of said alkaline electrolyte;

wherein said auxiliary cathode material is at least partially wetted by said alkaline electrolyte; and wherein said auxiliary cathode material and said manganese dioxide cathode are in intimate physical contact one with the other, with no substantial electrical resistance therebetween.

2. The primary or rechargable cell of claim 1, in which catalyst catalyses the absorption of hydrogen pressurized in the range of from at least 5 to 15 psig up to pressure relief of the cell.

3. The primary or rechargable cell of claim 2 in which the substrate of the auxiliary cathode is chosen from the group consisting of carbon, graphite and metal and the catalyst is chosen from the group consisting of carbon; catalytically active metals; salts and oxides of lead, nickel, titanium, lanthanum, chromium, tantalum, and alloys thereof and said catalytically active metals; and mixtures of carbon with said metals, salts or oxides.

4. The primary or rechargeable cell of claim 3 in which the catalytically active metal is a noble metal.

5. The primary or rechargeable cell of claim 4, in which the noble metal is selected from platinum, palladium, ruthenium, rhodium, iridium, osmium and silver.

6. The primary or rechargable cell of claim 3 in which the catalytically active metal is nickel or an alloy of nickel with lanthanum or titanium.

7. The primary or rechargeable cell of claim 3, in which the auxiliary cathode material is mixed with said manganese dioxide cathode.

8. The primary or rechargeable cell of claim 4, in which the ratio of noble metal to said manganese dioxide of said cathode is substantially 30:70.

9. The primary or rechargeable cell of claim 3, in which said auxiliary cathode material is formed as a discrete electrode and is placed in electronic contact with said manganese dioxide cathode.

10. The primary or rechargeable cell of claim 9, in which the discrete electrode is an annulus formed of carbon mixed with palladium and rhodium, and is located on top of said manganese dioxide cathode.

11. The primary or rechargeable cell of claim 1, in which said manganese dioxide is mixed with 5 to 20% by weight of graphite.

12. The primary or rechargeable cell of claim 1, in which the anode comprises zinc powder immobilized in a gel of the electrolyte.

13. The primary or rechargable cell of claim 1, in which the anode comprises a paste of zinc powder.

* * * * *